June 17, 1924.

W. FINK

SHEARS FOR CUTTING IRON BARS

Filed Aug. 10, 1923

1,497,676

Witnesses:
H. Seufert.
P. Pfafferott.

Inventor:
Wilhelm Fink.
by Heard Smith & Tennant
Attys.

Patented June 17, 1924.

1,497,676

UNITED STATES PATENT OFFICE.

WILHELM FINK, OF BONN-ON-THE-RHINE, GERMANY.

SHEARS FOR CUTTING IRON BARS.

Application filed August 10, 1923. Serial No. 656,720.

*To all whom it may concern:*

Be it known that I, WILHELM FINK, a citizen of Germany, residing at Bonn-on-the-Rhine, Germany, have invented a new and useful Shears for Cutting Iron Bars, of which the following is a specification.

The object of my invention is a shears for cutting bars of iron or the like material, of that type in which the one cutting-blade is fixed and the other is rotated about the axis of the system. The bars to be cut may be round, square or flat shaped. Particular objects are to be found in the several features of improvements and will hereinafter appear.

Figure 1:
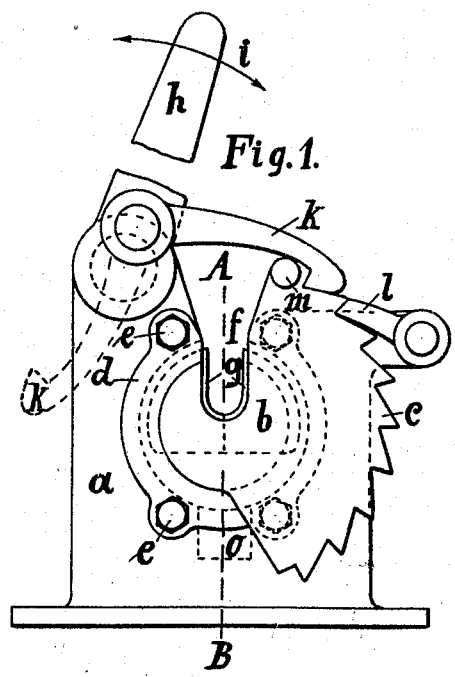
Figure 2:
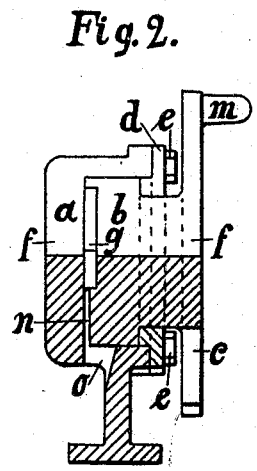
Figures 3, 4:
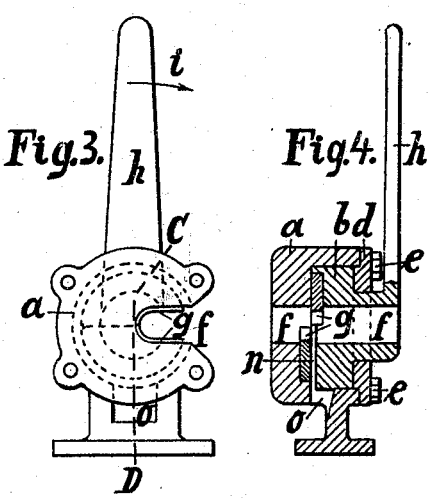
Figure 5:
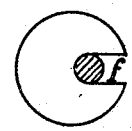
Figure 6:
Figure 7:
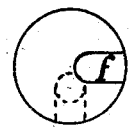

In the accompanying drawing Fig. 1 is a side-view of my shears, Fig. 2 a partial vertical section on the line A B in Fig. 1. Fig. 3 shows a more simple form of my shears and Fig. 4 a vertical section on the line C D in Fig. 3. The Figs. 5, 6 and 7 are diagrams showing the action of the shears.

The shears consists of a casing $a$ which on the inside is provided with a cylindrical bore, in which is placed a circular disk $b$ in such a manner, that it can be rotated. The disk $b$ is provided with a ratchet-semicircle $c$ and held in position by a ring $d$, which is fastened by screws $ee$ or in any other suitable manner. Both, the casing $a$ and the disk $b$ are also provided with a mouth-shaped opening $f$ which extends from the circumference to the centre or near to the centre of the system. When opened an iron bar can be put in said mouth-shaped opening. Within the mouth knife-blades $g$ are fixed, one of them to the casing $a$ and the other to the disk $b$. When the latter is set in rotating motion, and thus the mouth closed, the knife-blades act as a shears.

To operate the shears, the lever $h$ is to be pulled forward and backward in the direction of the arrow $i$, whereby the disk $b$ is set in rotating motion by means of the hook-ratchet $k$. The latter can be turned up into the punctuated situation. In this position of the hook an iron-bar can be put in the mouth of the shears if the latter is open. Whilst the lever $h$ is moved backward the ratchet-semicircle $c$ is held in position by a pawl $l$ until the hook-ratchet $k$ engages with another tooth of the ratchet-semicircle $c$. In this manner the movement of the disk $b$ is continued until the iron-bar is cut off by the knife-blades $g$. By means of the handle $m$ the rotating-movement of the disk can be proceeded by hand until the mouth will be open again and the shears fit for a new operation.

In order to avoid the accumulation of dirt and small particles of iron between the casing $a$ and the disk $b$, the knife-blade which is fixed to the latter projects out of the disk, thus originating a space $n$ between the inward surface of the casing $a$ and the surface of the disk $b$, and below the latter is provided an opening $o$. All particles of iron or dirt which may enter between the knife-blades, will fall down through the space $n$ and the opening $o$.

Figs. 3 and 4 show my shears in a more simple feature, especially for cutting small bars. Within the cylindrical casing $a$ is placed the disk $b$ and held in position by a ring $d$ and screws $ee$. Both, the casing $a$ and the disk $b$ are provided with a corresponding mouth-shaped opening $f$ which extends from the circumference to the centre or near to the centre of the system. Within the mouth knife-blades $g$ are fixed, one of them to the casing $a$ and the other to the disk $b$. By means of the lever $h$, when moved in the direction of the arrow $i$, the mouth can be shut and an inlaid iron-bar cut off. Dirt and small iron-particles will fall down through the space $n$ and the opening $o$.

By the diagrams Fig. 5, 6 and 7 the action of my shears is shown. Fig. 5 shows the open mouth with an iron-bar put in, Fig. 6 shows the mouth nearly closed and the bar cut off partially, and Fig. 7 shows the mouth totally closed. In this situation of the latter, the bar is cut off.

Having thus described my invention, what I claim as new, and desire to secure by Letters Patent, is—

1. Shears for cutting iron bars and the like comprising a casing having an open-ended slot, a knife blade secured to the casing at one edge of the slot, a rotatable disk in the casing, said disk having an open-ended radial slot which in one position of the disk is in alignment with the slot of the casing, whereby the material to be cut may be placed into the aligned slots, a knife blade secured to the disk on the opposite side of the slot from the first-named knife blade, said disk having a ratchet, and a pivoted lever having a pawl to engage said ratchet and by which the disk may be turned.

2. Shears for cutting iron bars and the like comprising a casing having an open-ended slot, a knife blade secured to the casing at one edge of the slot, a rotatable disk in the casing, said disk having an open-ended radial slot which in one position of the disk is in alignment with the slot of the casing, whereby the material to be cut may be placed into the aligned slots, a knife blade secured to the disk on the opposite side of the slot from the first-named knife blade, said disk having a ratchet, and a pivoted lever having a pawl to engage said ratchet and by which the disk may be turned, the cutting surface of the disk being separated slightly from the adjacent wall of the casing and the latter having an opening below the space through which dirt and small iron particles may be discharged.

WILHELM FINK.

Witnesses:
 ERIC ROONEY.
 PAUL DREES.